United States Patent [19]
Greenblatt et al.

[11] Patent Number: 5,809,238
[45] Date of Patent: Sep. 15, 1998

[54] DATA SERVER WITH EVENT DRIVEN SAMPLING

[75] Inventors: Sam Greenblatt, Agoura; Alex Yung, Walnut, both of Calif.

[73] Assignee: Candle Distributed Solutions, Inc., Santa Monica, Calif.

[21] Appl. No.: 494,831

[22] Filed: Jun. 23, 1995

Related U.S. Application Data

[63] Continuation of Ser. No. 264,403, Jun. 23, 1994, Pat. No. 5,615,359.

[51] Int. Cl.$^6$ ...................................................... G06F 13/00
[52] U.S. Cl. .............................. 395/200.32; 395/200.54; 395/610; 395/800.28
[58] Field of Search ................................ 395/200.11, 610

[56] References Cited

U.S. PATENT DOCUMENTS

| | | | |
|---|---|---|---|
| 5,109,486 | 4/1992 | Seymour | 395/200.11 |
| 5,596,744 | 1/1997 | Dao et al. | 395/610 |
| 5,615,359 | 3/1997 | Yung | 395/610 |

FOREIGN PATENT DOCUMENTS

| | | |
|---|---|---|
| 0 259 224 | 3/1988 | European Pat. Off. . |
| 2232763 | 9/1990 | Japan . |

OTHER PUBLICATIONS

Richard Snodgrass, "A Relational Approach to Monitoring Complex Systems", *ACM Transactions on Computer Systems*, vol. 6 No. 2, May 1988, pp. 157–196.

Author Unknown, "Method to Centralize Maintenance Activity of a Performance Database", *IBM Technical Disclousure Bulletin*, vol. 35 No. 2, Jul. 1992, pp. 364–368.

*Primary Examiner*—Thomas G. Black
*Assistant Examiner*—Hosain T. Alam
*Attorney, Agent, or Firm*—Merchant, Gould, Smith, Edell, Welter & Schmidt

[57] ABSTRACT

A data server data base system applies a request for data to a data engine which launches a probe via network transport that causes the data to be collected on a remote platform and returned via network transport. The returned data is then applied to the requesting user application in the form of one or more rows of columnar data emulating the return of data from a conventional data base system including data tables. This operation may further be enhanced by the inclusion of Event processing in which the occurrence of an event based on a predicate test is determined by the data server without requiring attention of the user application. In particular, the user application stores a rule statement in the data server and then references that statement by name in a data inquiry. An event level data probe is invoked to collect the data referenced in the rule statement and the collected data is tested in accordance with the rule statement to determine if the event has occurred. Data passing the rule statement test is returned to the user application if the event is determined to have occurred unless Delta processing is invoked in which case only data representing a transition from Event true to Event false or Event false to Event true is returned.

18 Claims, 3 Drawing Sheets

FIG. 2

| S# | CPU_UTIL | CPU |
|---|---|---|
| 1 | 88% | P1 |
| 2 | 91% | P1 |
| 3 | 93% | P1 |
| 4 | 96% | P1 |
| 5 | 94% | P1 |
| 6 | 93% | P1 |
| 7 | 92% | P1 |
| 8 | 96% | P1 |
| 9 | 88% | P1 |
| 10 | 97% | P1 |

FIG. 3

| RuleName | Predicate | Time | Page_Rate |
|---|---|---|---|
| CPU_BUSY | CPU_UTIL > 95% | 03:04 | 12 |
| CPU_BUSY | CPU_UTIL > 95% | 03:08 | 16 |
| CPU_BUSY | CPU_UTIL > 95% | 03:10 | 8 |

FIG. 4

| S# | CPU_UTIL | CPU |
|---|---|---|
| 1 | 88% | P1 |
| 2 | 91% | P1 |
| 3 | 93% | P1 |
| 4 | 96% | P1 |
| 5 | 94% | P1 |
| 6 | 93% | P1 |
| 7 | 92% | P1 |
| 8 | 96% | P1 |
| 9 | 88% | P1 |
| 10 | 97% | P1 |

FIG. 5

| RuleName | Predicate | Time | Page_Rate |
|---|---|---|---|
| CPU_BUSY | CPU_UTIL > 95% | 03:04 | 12 |
| CPU_BUSY | CPU_UTIL > 95% | 03:05 | 11 |
| CPU_BUSY | CPU_UTIL > 95% | 03:08 | 16 |
| CPU_BUSY | CPU_UTIL > 95% | 03:09 | 13 |
| CPU_BUSY | CPU_UTIL > 95% | 03:10 | 8 |

| RuleName | Predicate |
|---|---|
| CPU_BUSY | CPU_UTIL > 95% |
| PAGE_BUSY | PAGE_RATE > 50 |
| HIGH_CPU | AVG(CPU_UTIL) > 90% |
| HIGH_PAGING | AVG(PAGE_RATE) > 30 |
| HIGH_IO | AVG(IO_COUNT > 5000 |
| BAD_RESPONSE_TIME | HIGH_CPU or HI_PAGING or HI_IO |
| OVERLOAD | CPU_BUSY and PAGE_BUSY |

FIG. 6

DATA SERVER WITH EVENT DRIVEN SAMPLING

CROSS REFERENCE TO RELATED APPLICATION

This application is a continuation of Ser. No. 08/264,403, filed on Jun. 23, 1994, by Alex Yung, issued Mar. 25, 1997, as U.S. Pat. No. 5,615,359.

BACKGROUND OF THE INVENTION

1. Field of the Invention

This invention relates in general to data processing techniques for collecting and managing data such as techniques for monitoring the performance of computer networks, and in particular to data base techniques, such as relational data bases including those using SQL engines, for collecting and managing data in a network. One important specific application for the present invention is in the monitoring and comparing of performance data from computers in a network.

2. Description of the Prior Art

In conventional computer performance monitoring applications, such as the OMEGAMON system from CANDLE CORPORATION of Santa Monica, Calif., the monitoring application generates a request for data, such as "How busy is the CPU?". This request is sent by the monitoring application to a data subsystem having such information via the network transport system. The data subsystem returns the information requested to the monitoring application which then processes the data as required. Conventional data subsystems, such as relational data bases, maintain the data to be requested in tables. Some types of data, such a network monitoring data is often processed by predicate logic to compare the data against a predetermined threshold. Such comparisons are typically performed by rule based testing.

The systems to be monitored often include complex mainframe based computer networks. The information to be monitored continuously becomes more complicated so that there are enormous amounts of information to be analyzed. In order to reduce the amount of data to be reviewed by the system operators, some techniques have been developed to further filter the data before review by the operator, one example of which is the display by exception technique of the OMEGAVIEW system referenced above. In that application, once the data has been collected, the internal logic of the OMEGAVIEW system displays data to the human operator in accordance with a predicate logic test. The data that has been retrieved is compared to a predetermined predicate or threshold level and is displayed to the operator if and only if the data exceeds the predicate or threshold.

As the computer network systems to be monitored grow in size and complexity, the data to be monitored and tested grow the same way. What are needed are improvements in the structure of database systems and monitoring applications to reduce the substantial computational time, and other overhead requirements, of conventional monitoring applications.

SUMMARY OF THE INVENTION

In accordance with the present invention, a DataServer is located intermediate the data requesters and data sources and is utilized for data collection tasks by all data requesters, such as user applications, to reduce the redundant efforts and computational overhead associated with conventional data collection tasks. The DataServer responds to the request for data by launching a probe via network transport that causes the data to be collected and returned to the DataServer. The collected data is returned to the requesting user application in the form of one or more rows of columnar data emulating the return of data from a more conventional data base system including actual data tables of pre-collected data. By replacing data stored in locations in actual data tables with address and data collections instructions for causing a probe or other agent to cause the data to be collected on the remote platform and returned to the user in the form of rows and columns, substantial computing overhead is saved. This reduction in overhead across the network is particularly important in applications such as performance monitoring of networked heterogeneous platforms.

The collected data may be filtered and/or temporarily stored in buffers or tables in the DataServer and transferred on a row by row basis as requested by the user applications. A conventional structured query language or SQL may be used to provide access to the data base using a standardized inquiry statement approach.

In addition to centralizing the data collection tasks in the form of probes which may conveniently be specialized for the platform on which the data is to be collected, the DataServer further reduces application specific processing time requirements by localizing certain data processing tasks in the DataServer. These localized data processing tasks are related to the data being collected. In particular, the DataServer uses ruled based logic to provide a centralized, preliminary predicate logic evaluation of monitoring data being collected so that only data achieving the predetermined rule based predicate is passed onto the user application through the transport network. By operating on the collected data to transfer only data that has passed the predicate logic test, substantial user application data processing, and particularly network data traffic, is saved.

In a simple DataServer configuration, an application requesting data where the data exceeded a predicate test threshold would be notified whenever a data sample was collected by the DataServer probe. The application would interrogate the DataServer in response to each such notification to determine if the data sample in fact indicated an occurrence of the event specified by the predicate test, that is, if the result of the predicate test by the DataServer indicated that the event had occurred. In a common interrogation of this kind, the application would determine the row count of a data table used to store sampled data which exceeded the predicate because a row count of zero would indicate that no data had passed the predicate test. This requires a one to one correlation between data sampling by the probe and DataServer interrogation by the application even though a substantial number of samples, and therefore of interrogations, would produce no usable data because the event had not occurred.

In accordance with another aspect of the present invention, the event testing as well as the predicate testing is performed by the DataServer. A probe is launched to collect the data required by the predicate test. Thereafter a test to determine if the event has occurred is performed by the DataServer rather than the user application and if and only if the DataServer event test was positive, indicating that an event had occurred because the predicate test was positive, would the user application be notified so that the user application could collect the data. By having the DataServer generate a probe to collect the data for a predicate test and then testing the data sampling to determine the occurrence of the event, substantial interrogations by the user application that would have simply indicated that the event had not occurred may be saved.

Data processing in the DataServer is controlled by the individual user applications by means of an extension of the SQL data base technique. In particular, one or more user applications are provided with the ability to define predicate logic rules stored by name in a RuleBase Table in the DataServer. User applications have access to an Event() function included within an otherwise conventional SQL inquiry that controls the operation of the DataServer by requiring that collected data be processed in accordance with a selected rule in the RuleBase Table. If and only if the data achieves the predicate specified by the selected rule, then the row containing the relevant data is transferred back to the user application in response to the SQL inquiry, thereby substantially reducing the computational overhead required of the user application otherwise associated with data collection process.

In a further aspect, the present invention provides a method of operating a data base by applying a rule statement—providing a predicate logic test for specified data—to a data server from a user application, storing the rule statement by rule name in a rule table in the data server, applying an inquiry statement—referencing the rule statement by rule name and requesting the collection and return of either the tested or other collected data—to the data server from the user application, recursively invoking an Event level data probe—in response to the data specified to be tested by the rule statement—to collect the data to be tested from an appropriate data source and to emit the test data to the data server, testing the data returned by the Event level data probe in accordance with the predicate test, determining that the data to be returned has in fact been collected by doing a rowcount test, and invoking an Advisor level probe to return the requested data (when the tested data is determined to have passed the predicate test) to the user application in response to the inquiry statement.

In addition, the method may further include storing a nested rule statement by rule name in the rule table, the nested rule statement referencing additional rule statement by rule name, and processing each nested rule statement to collect data specified by each rule statement referenced thereby.

In another aspect, the step of invoking of the Advisor level probe is enhanced by testing the data returned by the Event level data probe to determine if the data has changed state from passing to not passing the predicate test or from not passing to passing the predicate test, and inhibiting the return of data that has not changed state.

These and other features and advantages of this invention will become further apparent from the detailed description that follows which is accompanied by drawing figures. In the figures and description, reference numerals indicate various features of the invention, like numerals referring to like features throughout both the drawing figures and the description.

BRIEF DESCRIPTION OF THE DRAWINGS

FIG. 2 is a representation of some of the columns in DataTable 26 of FIG. 1.

FIG. 3 is a representation of additional columns in AdvisorTable 38 of FIG. 1.

FIG. 4 is a representation of some of the columns in DataTable 26 of FIG. 1 during Delta processing.

FIG. 5 is a representation of additional columns in AdvisorTable 38 of FIG. 1 during Delta processing.

FIG. 6 is a representation of a series of rules entered into RuleBase Table 34 of FIG. 1.

DETAILED DESCRIPTION OF THE PREFERRED EMBODIMENT(S)

Figure 1:
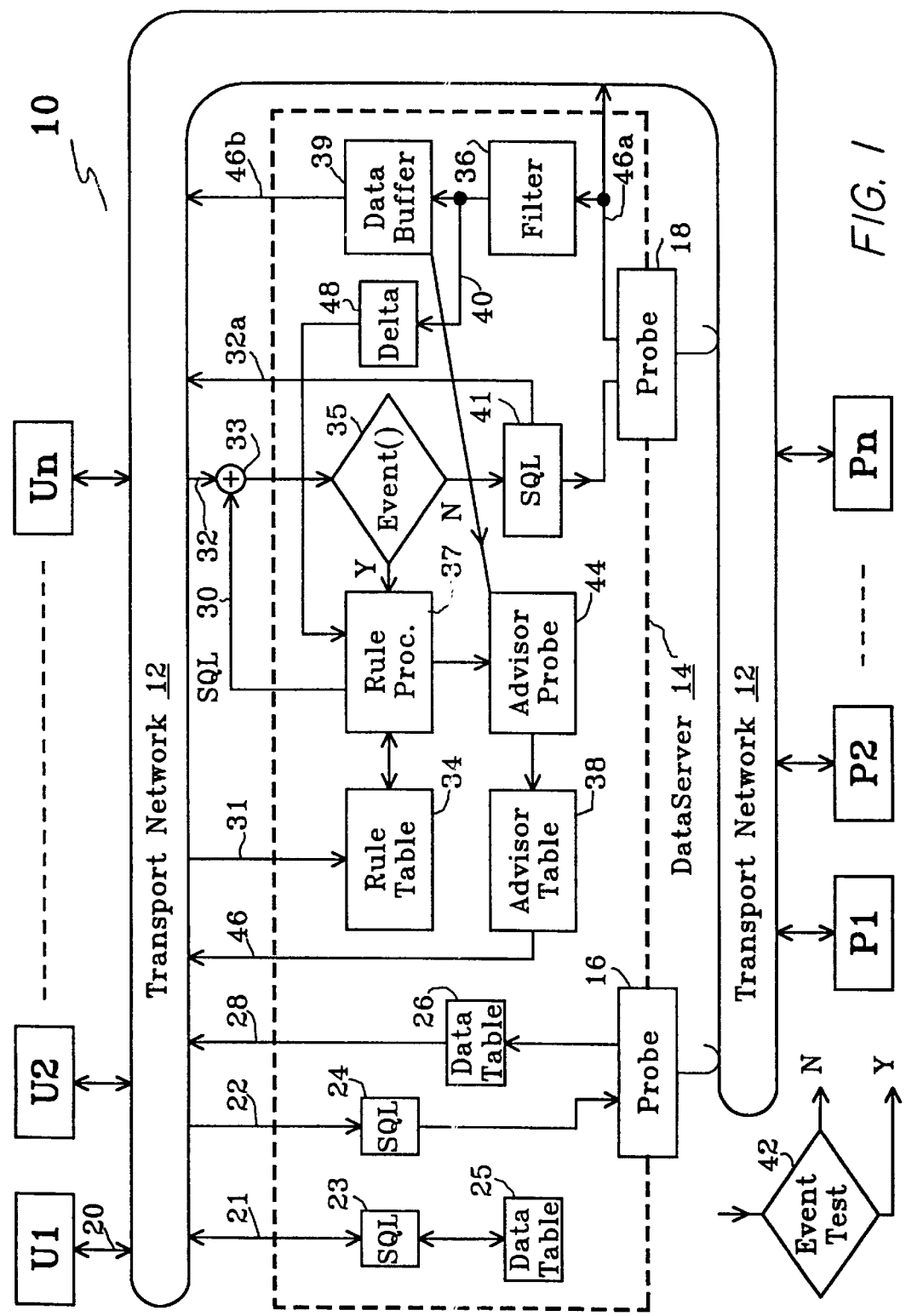
FIG. 1 is a function block diagram of a computer network monitoring system according to the present invention.

Referring now to FIG. 1, monitored computer network 10 includes a plurality of user applications U1 through Un which monitor networked platforms P1 through Pn via transport network 12. As described so far, computer network 10 is a conventional computer network in that the user applications may be located on any of the computer platforms and monitor any or all of the platforms because the platforms are networked, that is, tied together for communications by transport network 12.

FIG. 1 is a block diagram representation of a technique most conveniently implemented in software so it is intended to be an aid in understanding how this technique may be implemented rather than as a literal block diagram of hardware subsystems. A flow description of a preferred implementation of the technique is provided herein below.

In accordance with the present invention, computer network 10 further includes DataServer 14 which may be located on any of the platforms or on a specialized platform which is linked with networked platforms P1 through Pn by transport network 12. DataServer 14 may be considered to be linked with the platforms in three somewhat different manners as illustrated by the diagram in FIG. 1 by DataServerI/O path 21, DataServerInput and DataServerOutput paths 28 and 22, and by DataServerInput and DataServerOutput paths 32 and 46 which connect DataServer 14 to each user application via transport network 12. In addition, the later two linkages between DataServer 14 and the platforms includes data probes such as DataProbes 16 and 18 as will be described in greater detail below.

DataServer 14 serves as a data base for holding, and/or collecting data, such as data from platforms P1 through Pn, that are required for user applications U1 through Un. For convenience of description, a relational data base model is described although persons of ordinary skill in this art could easily use other types of data bases. As a relational database, DataServer 14 is equipped with one or more data retrieval engines such as those using conventional system query language, or SQL statements. Some of the SQL engines used in DataServer 14 may include enhancements to the conventional SQL statements as will be described below.

The operation of DataServer 14 via DataServerI/O path 21 as a conventional SQL database is described first, for convenience, followed by a description of DataServer 14 via DataServerInput path 22 and DataServerOutput path 28 as a conventional DataServer. Thereafter, the operation of DataServer 14 via DataServerInput path 32, AdvisorTable-Output path 46, and RuleTable input path 31 in accordance with the present invention will be described.

In the following descriptions, various DataServer paths will be individually described as single paths in order to provide a clearer explanation of the operation of computer network 10, particularly the data flow direction. All such paths may however be implemented using any of the various conventional techniques.

In some applications, DataServer 14 may be organized to operate as a conventional SQL database in which data is stored in DataServer 14 and retrieved therefrom by user application U1. This arrangement is described for clarity and completeness although not necessarily required for operation in accordance with the present invention. In this configuration, user application U1—or any other user application—may direct data via bi-directional communication path 20 to transport network 12 and therefrom via DataServerI/O path 21 to conventional SQL engine 23 for storage in DataTable 25. Thereafter, by submitting an appropriate inquiry, such as an SQL statement, user application U1—or any other user application—may request the retrieval of such data. In response to the SQL statement, data will be returned from DataTable 25 under the control of conventional SQL engine 23 via DataServerI/O path 21, transport network 12 and bi-directional communication path 20.

In this manner, the operation of a conventional SQL engine is illustrated in which any data to be retrieved from a database must first be stored therein by the requesting user application—or another application—and then retrieved by the SQL from the database in response to the SQL statement.

One of the substantial disadvantages of such conventional operations as a data base is that data must be stored in DataTable 25 before the data can be requested.

A more complex operation is required for operation as a DataServer, emulating a conventional data base, in which the data to be returned is collected by the DataServer in response to the SQL statement requesting that data. For example, user application U1 may apply an SQL statement to DataServer 14 which requires the return of data related to networked platform Pi which data has not yet been stored in DataServer 14. In response to a request for such data, a data probe is launched by DataServer 14 to collect the required data from networked platform P1 via transport network 12.

DataServer 14 includes a plurality of probes, two of which are represented by DataProbes 16 and 18, by which DataServer 14 collects data, such as performance data, from the platforms via transport network 12. Such probes may conveniently be written so that the requesting application, such as user application U1, need not know the details of such data collection from the intended platform. That is, such probes may be prepared for use with the designated platforms, and maintained with DataServer 14, so that the information required to collect the data need not be redundantly maintained on many platforms nor updated for changes in many places.

It is important to note that since the data probes or agents may be extremely specialized for collection of data on specific platforms, the nature of platform is transparent to the requesting user. This is extremely advantageous in requesting data from networked heterogeneous platforms because the details of data collection are centralized in the probes and transparent to the requesting application.

As a simple example, a DataProbe may include address and inquiry instructions so that when DataProbe is initiated, or launched, the DataProbe transfers a request initiating the operation of a data collection application on another platform, such as a simple subroutine written for and operating on that particular platform and the return of the resultant data to the DataServer platform for return to the user in the form of one or more rows of columnar data emulating the data returns from a conventional data base table of pre-collected data.

In particular, user application U1 may provide an SQL statement via bi-directional communication path 20, transport network 12 and DataServerInput path 22 to DataServer SQL engine 24 requesting data resident on or related to a particular platform, such as networked platform P1. The requested data must then be collected from networked platform P1 via transport network 12. DataProbe 16 is launched by DataServer 14 in response to the SQL statement applied to DataServer SQL engine 24. In accordance with the pre-programmed operation of DataProbe 16, the data will be collected from a local platform or, if necessary, from a remote platform via transport network 12 and returned for storage in DataTable 26 by DataProbe 16.

Once launched, DataProbe 16 communicates with networked platform P1 via transport network 12 to initiate a data collection application (resident within DataProbe 16 or on networked platform P1) to collect the required data. The data collection application may in a simple form be a conventional application on networked platform P1 which collects the requested data for networked platform P1. As a result, however, of the launching of DataProbe 16, the requested data once collected by the networked platform P1 data collection application is then returned via transport network 12 to DataProbe 16 for storage in DataTable 26.

Once the requested data is available in DataTable 26, it may conveniently be returned to user application U1 via DataServerOutput path 28, transport network 12 and bi-directional communication path 20.

The system as described so far still has the disadvantage that the data must be stored in a data table, such as DataTable 26, before it can be returned to the requesting application. This requirement is the overhead time required for such storage. Many conventional applications require that the data be provided to them in data table format, that is, in rows and columns. The collection and storage of data in a data table is still an extremely overhead intensive task.

DataServer 14 serves to provide a response an inquiring request without necessarily actually storing the data in a table before return, but rather simply by collecting the data with an appropriate probe and returning the data to the requesting application in the form of one or more appropriate rows of data, emulating a more conventional data base application. The use of a data probe to provide data collection in response to a data request and provide data in the form of the expected row or rows and columns of data as if the data had in fact been stored in a table is an important aspect of DataServer 14. This technique substantially reduces the overhead required to collect and manage the data.

In accordance with the present invention, DataServer 14 is provided with enhanced abilities to permit data to be returned to a user application if and only if a predicate logic test applied to the data collected by the dataprobe is true, that is, only if the data has achieved the predetermined predicate logic threshold.

In the above example, user application U1 may effectively submit a data inquiry to DataServer 14 requesting CPU_UTIL data from networked platform P1 to be returned if and only if the CPU_UTIL data exceeds 95%. Although the related dataprobe is required to collect CPU_UTIL data without regard for the value of the data, the CPU_UTIL data is returned to user application U1 only when that data exceeds 95%.

In accordance with the present invention, a substantial reduction of the use of system resources is therefore achieved by collecting data in response to a request for the data (rather than storing pre-collected data in a table), and by a further enhancement which limits the data returned to the user application to that data which meets the predicate logic requirements of the use application. This may be thought of as an enhancement to the data engine, such as the SQL engine shown in FIG. 1 by the addition of an EVENT()

function to the SQL statement. Before the EVENT() function can be used, the events on which the predicate logic tests are to be based must be provided by the user application to DataServer 14. In a particular situation, if the only data pertinent to user application U1 regarding CPU usage occurs when the CPU usage exceeds a threshold or limit of 95%, the appropriate rule might be stated by defining a new term, CPU_BUSY, to represent CPU_UTIL greater than 95%.

Before use in an EVENT() function, the rule must be stored by user application U1 in RuleBase Table 34 in DataServer 14. The rule is transferred from user application U1 via bi-directional communication path 20, transport network 12 and RuleTable input path 31 for storage in RuleBase Table 34. Each such rule is stored, in the form of its name and its predicate, as columns in a row in RuleBase Table 34 via RuleTable input path 31. The above CPU utilization rule, which may simply be used for example to activate an alarm when CPU usage exceeds 95%, would be stored as the CPU_BUSY rule in the name and predicate column of RuleBase Table 34 as follows:

| NAME | PREDICATE | |
|---|---|---|
| CPU_BUSY | CPU_UTIL > 95%. | (1) |

Thereafter, when an SQL statement is issued by user application U1 including an EVENT() function based on the CPU_BUSY rule, i.e. EVENT(CPU_BUSY), the data is returned to user application U1 if and only if the CPU_UTIL data exceeds 95%. The enhancement of the SQL engine function is depicted in FIG. 1 by the addition of event function and rule processing loops which operate in a recursive manner to probe DataServer 14 with SQL statement 30 to determine when data meeting the predicate test has been collected and the data to be returned has been collected and is available for return to the requesting user application. Of course, the data to be tested in accordance with the predicate rule need not be the data collected for return to the user application.

That is, the inquiry statement may request that data A be returned when data B is determined to have achieved a predicate test associated with data B. For convenience, it may be easier to understand the following description of the present invention by assuming that the data to be collected is also the data to be tested or at least is collected at the same time.

With regard now to the operation of the recursive loop, the event function and rule processing loops recursively apply SQL statement 30 to DataServer 14 to cause an appropriate DataProbe 18 to be launched until the data retrieved is found to achieve the identified predicate. When the predicate is reached, SQL statement 30 need no longer be recursively applied via summer 33 to NestedEvent() processor 35 for causing DataServer SQL engine 41 to launch the appropriate version of DataProbe 18 to collect the requested data for testing. (If the data to be returned to the user application was not collected at the same time as the data to be tested was collected, RuleProcessor 37 would then operate to pass the request for the collection of the desired data to be collected to DataServer SQL engine 41.) As noted above, the data to be collected for return to the user program may differ from the data to be tested in accordance with the Rule statement. In either event, the requested data to be returned to the user application is stored in DataBuffer 39 when collected by DataProbe 18. To determine when data has been collected which is to be returned to the requesting user because the tested data has achieved the predicate, a simple Rowcount() test is applied to DataBuffer 39. When the Rowcount() is not zero, data has been collected which may be returned to the requesting application.

In particular, after the CPU_BUSY rule shown in statement (1) above has been stored in RuleBase Table 34, user application U1—or any other appropriate user application— may provide a data inquiry to DataServer 14 in the form of an SQL statement including an event function based on the stored rule. The SQL Event() statement is applied to DataServer 14 via bi-directional communication path 20, transport network 12 and DataServerInput path 32 and summer 33, the operation of one example of which will be described below in greater detail. Many other ways of implementing the same results are available to those skilled in these arts.

The SQL statement is applied to NestedEvent() processor 35 which determines if an Event() function is included. The operation of DataServer 14 if an Event() function is included is described immediately below with regard to FIG. 1. This description also includes the description of the operation of DataServer 14 if an Event() is not included because, as described below in greater detail, if an Event() function is included, DataServer 14 operates recursively until the predicate of the Event() function is achieved after which DataServer 14 may be viewed as operating in its less complex form as if the Event() function had not been imbedded in the request for data. That is, the data collected for testing is tested until the predicate is achieved after which the data to be returned to the user is so returned.

Although the data to be tested may be collected and tested before the data to be returned to the user has been collected, it is preferable to collect both data, if different, at the same time. In a preferred implementation, the data to be collected for return to the user is therefore collected by DataProbe 18 at the same time that the data to be tested is collected so that the data returned to the user application is the data desired at the instant the data to be tested which The differences in the results of these operations is described thereafter with regard to the FIGS. 2 through 6.

Referring now to FIG. 1 and the situation in which an Event() function is included in the request from the user application, the SQL statement including the Event() function is applied to RuleProcessor 37 which obtains the previously stored rule from RuleBase Table 34 to expand the Event() by creating recursive SQL statement 30 (and if appropriate) to activate AdvisorProbe 44 as described in greater detail below. SQL statement 30 may be considered to be a recursive SQL statement in that it is created within DataServer 14 and used as a data inquiry that is repeatedly applied to DataServer 14 until the predicate is achieved. The Event(CPU_BUSY) SQL statement applied to NestedEvent() processor 35 results in a recursive SQL statement 30 requesting the CPU_UTIL data as specified in the CPU_BUSY rule.

Recursive SQL statement 30 is then applied to DataServer 14 via summer 33. Recursive SQL statement 30 is shown in FIG. 1 as output from DataServer 14 for reapplication thereto through summer 33 to emphasize that recursive SQL statement 30 is functionally not distinguishable from any other SQL statement without an Event() function. In particular applications, it may well be more convenient to separate SQL statements differently and apply them more directly to the SQL engine. In any event, when recursive SQL statement 30 is found to not include an Event() function when processed by NestedEvent() processor 35, SQL statement 30 is applied to DataServer SQL engine 41. Conventional SQL engine 23, DataServer SQL engine 24 and DataServer SQL engine 41 may all conveniently be implemented as a single SQL engine but are discussed separately herein to clarify the portions of the operation of DataServer 14 that may be described with regard to a conventional SQL engine implementation and those which are not conventional.

In the simplest configuration of DataServer 14, one which does not include the filtering or Event() operations described above, the request applied via DataServerInput path 32 would not include an Event() function and therefore may be considered to be applied directly to DataServer SQL engine 41. That is, if an Event() function is not detected summer 33 and NestedEvent() processor 35 will operate as if bypassed by a direct inquiry path 32a, such as a path leading directly from transport network 12 to DataServer SQL engine 41, which is useful for a DataServer 14 implemented without event processing. Direct inquiry path 32a may simply represent the situation in which summer 33 provides a direct path from DataServerInput path 32 to NestedEvent() processor 35 which is disabled or otherwise caused to pass along the request without further delay directly to DataServer SQL engine 41.

In either event, upon receipt of a request for data, and as shown above for example with regard to DataServer SQL engine 24 and DataProbe 16, DataServer SQL engine 41 launches DataProbe 18 which collects the CPU_UTIL data from networked platform P1 as requested and emits the collected data back to DataServer 14. If an Evento was not included in the request for data applied by DataServerInput path 32, or if DataServer 14 is implemented in a less complex form, that is, using direct inquiry path 32a, the data collected by DataProbe 18 may be directly returned to the requesting user. It is preferable to return such data in the form of a response to an inquiry to a conventional data base, that is, in the form of one or more rows of data in columnar format because most conventional user applications are configured to operate with a conventional data base and require a response in this format. This permits DataServer 14 to respond to inquiries from various user applications transparently with respect to the platforms from which the data to be returned is collected. That is, since each DataProbe is written for the platform from which the data to be collected for return and or testing, the user application need not know the details of the collection nor of the platform from which the data is to be collected. This makes the use of DataServer 14 convenient in a heterogeneous network environment.

If direct inquiry path 32a or its equivalent is used, the collected data in table format may simply be returned by DataProbe 18 directly to transport network 12 and requesting user application U1 via a direct path, such as Output paths 46a or 46b, from DataProbe 18 to transport network 12. Output path 46a may conveniently be an extension of the path from DataProbe 18 to filter 36 which is directed to transport network 12 while Output path 46b may simply be a path from DataBuffer 39 to transport network 12.

Output paths 46a and 46b may simply be considered to be the direct versions of the path terminating in AdvisorTableOutput path 46, that is the path from DataProbe 18 to AdvisorTableOutput path 46 via filter 36, DataBuffer 39, AdvisorProbe 44 and AdvisorTable 38 when such elements are operated to directly return the data. When using AdvisorTableOutput path 46 in that manner, or Output path 46b, DataBuffer 39 is used to store the collected data to be returned in the form of one or more rows of data columns, that is, in the same form as the data would have been stored in a more conventional data table, such as DataTable 26 or DataTable 25. Alternatively, DataProbe 18 may simply be written to cause the platform on which the data collection application is accomplished, such as networked platform PI to return the data in tabular format directly to user application U1.

If event processing is used, the return data from DataProbe 18 is tested by predicate test processor, or filter, 36 to determine if the data has achieved its predicate, in this example, if the CPU_UTIL data exceeds 95%. If the CPU_UTIL data does exceed 95%, the data is stored in DataBuffer 39. Data from filter 36 is also provided via path 40 to Delta processor 48 if required and to rule processor 37.

Returning now to RuleProcessor 37, in addition to generating recursive SQL statement 30 by expanding the rule statement in the Event() function in accordance with the rule stored in RuleBase Table 34, RuleProcessor 37 causes the creation of an instance of AdvisorProbe 44 which is used to retrieve the return data stored in DataBuffer 39 for storage in AdvisorTable 38 and return to the requesting user application.

Whenever data is returned by DataProbe 18, RuleProcessor 37 attempts to retrieve a row of data from DataBuffer 39 by querying the rowcount in DataBuffer 39 to perform Event test 42. If the rowcount in DataBuffer 39 is zero, the return data has not been stored in DataBuffer 39 because the rule predicate was not achieved as determined by predicate test processor 36. In this configuration, the Event test used by DataServer 14 to determine if an event has occurred is a rowcount test.

In other words, using this particular type of event test, an event is deemed to have occurred only if data is stored in a table. Many other implementations of event testing are easily within the skill of the art. In fact, in many situations, the data is self testing in that data is only collected by the DataProbe if an event has occurred. Probes may be pre-programmed to perform the event testing before data is returned to DataServer 14 and/or the data may only exist if the event has occurred. Specialized probes, which may be considered to be event only probes, that only provide data if the predicate test has been passed indicating that the event has occurred, inherently perform the function of predicate test processor 36 so that this filter may be eliminated from DataServer 14.

Returning now to the example in which a test for rowcount greater than zero is used as the event test, if the rowcount in DataBuffer 39 is not zero, the event has occurred and data achieving the predicate test has been returned and is retrieved from DataBuffer 39 by AdvisorProbe 44 for storage in AdvisorTable 38. The data in AdvisorTable 38 is returned to user application U1 from DataServer 14 via AdvisorTableOutput path 46, transport network 12 and bi-directional communication path 20.

It must be noted that data is returned from AdvisorTable 38 via AdvisorTableOutput path 46 in response to the occurrence of the event specified in the SQL Event statement. That is, the data is effectively sampled only when the predicate test specified by the rule is true even though the data is collected by the DataProbe at specified intervals. As far as requesting user application U1 is concerned, the data sampling occurs only when the CPU_UTIL data does in fact exceed 95%, thereby substantially reducing the computational overhead otherwise required in user application U1.

Referring now to FIGS. 2 and 3, a set of simple examples will be used to illustrate the operation of DataServer 14 in response to conventional SQL statements and in response to SQL statements including an EVENT() function. FIG. 2 is a representation of the contents of DataTable 26 as a function of time resulting from the application by user application U1 to DataServer 14 of the following simple inquiry statement designed to retrieve CPU_UTIL data from DataTable A where the CPU_UTIL data is greater than 95% on networked platform P1:

```
SELECT    CPU_UTIL                            (2)
FROM      DataTable A
WHERE     CPU = P1 and CPU_UTIL > 95%.
```

It is important to note that DataTable A may be an actual data table such as DataTable 26, a surrogate table which only included returned data such as AdvisorTable 38 described below or may simply refer to the row or rows of data returned to the user application by DataProbe 18 in response to a request.

Some of the columns of the resultant data samples collected are shown in FIG. 2 which illustrates 10 sets of samples, one in each row, of data for convenience. FIG. 2 is an example of the results of the operation of interval sampling in which the associated data probe, such as DataProbe 18, is launched at fixed intervals. Assuming for convenience that the data collection interval for DataProbe 18 is one minute, the data in the first sample, or S#1, may have been collected at a time of 03:01 hours, the data in S#2 at 03:02 hours, etc. The processing overhead required for the data collection and processing shown in FIG. 2 is, on a relative scale, 10 units of computation.

In the simple implement of DataServer 14 in which a request is applied to DataServer. SQL engine 41 by direct inquiry path 32a and the collected data is returned via Output paths 46a or 46b, each such sample would cause the user application to be notified. If Event() was not available or desired, the row or rows of collected data would then be transferred to user application U1.

If event filtering is required but provided only by the application, the user application would be required to determine if the event had occurred by for example testing to determine if Rowcount() in DataBuffer 39, was greater than zero. These ten samples would therefore also represent 10 units of network traffic each of which would include a notification of the user application, an interrogation by the user application, a reply to that interrogation as well as the request for transfer and transfer of data exceeded the predicate test.

If for a particular task the only CPU_UTIL data desired was CPU_UTIL data only in the event that such CPU_UTIL data exceeded 95% as indicated by the "where" clause in the SQL statement, then the processing and network traffic for 7 out of 10 rows of CPU_UTIL data was unnecessary for this task. To reduce this unnecessary processing and traffic in accordance with the present invention, the CPU_BUSY rule specified in statement (1) above would be stored in RuleBase Table 34 and used to filter the data collected so that data was only collected and processed when CPU_UTIL was 95% or more. In particular, an extended SQL statement as shown below in statement (3) would be issued, as follows:

```
SELECT    CPU_UTIL, RuleName, Predicate,      (3)
          TimeStamp, PAGE_RATE
FROM      AvisorTable 38
WHERE     CPU = P1 and EVENT(CPU_BUSY)
```

Some of the columns of the resulting rows of data returned to user application U1 are shown in FIG. 3 which illustrates the 3 rows of data that would be processed during the same time interval during which the 10 rows of data shown in FIG. 2 were processed, i.e. from 03:01 through 03:10 hours. The columns of data shown in FIG. 2 are typically also provided in AdvisorTable 38 shown in FIG. 3, but these rows have not been repeated in FIG. 3 for ease of understanding. It is important to note that in accordance with the present invention, the samples related to the blank rows at times 1,2,3,5,6,7, and 9 do not result in notification to the user application and the resultant processing and network traffic.

In a conventional configuration, these samples would have caused unnecessary processing and traffic as the user application determined that they did not represent valid data or the occurrence of an event by for example testing to determine that the rowcount was not greater than zero. The rows shown in FIG. 3 are blank rows that would not in practice actually be present in AdvisorTable 38, but are shown herein to represent the processing overhead and network traffic saved in accordance with the present invention. The processing overhead and traffic actually required for the data collection and processing shown in FIG. 3 is, on the same relative scale used above with regard to FIG. 2, only 3 units of computation. Therefore, if for a particular task the only data CPU_UTIL data desired was CPU_UTIL data in the event that the CPU_UTIL exceeded 95%, then the unnecessary processing of 7 out of 10 rows of CPU_UTIL data can be eliminated for this task by use of the EVENTO function and the CPU_BUSY rule.

It is important to note that the data transferred to user application U1 need not be the same data collected by DataProbe 18 in response to a particular rule, such as the CPU_BUSY rule. In the statement example described above in statement (3), additional data such as TimeStamp and PAGE_RATE were collected by DataProbe 18 when the CPU_UTIL data exceeded its predicate, even though such additional data was not specified in the CPU_BUSY rule. This provides a substantial advantage because the only time the additional data is collected is when needed in accordance with the active rule. Alternatively, the data specified by the rule need not be entered into AdvisorTable 38 for transfer to user application U1. For example, in a particular task only the time of occurrence of the CPU_UTIL achieving 95% or more may be important. In that situation, the SQL statement and resultant columns transferred from AdvisorTable 38 to user application U1 would be limited to RuleName, Predicate and TimeStamp. In particular implementations of the present invention, the various user applications may require additional data, referred to herein as meta data, in order to process the data received from AdvisorTable 38. Such meta data may well include such information as data type and data length. All such meta data is made available to the user application by inclusion in columns in AdvisorTable 38.

Referring now to FIG. 6, a representation of a series of rules entered into RuleBase Table 34 is shown to illustrate some of the flexibility available with rules. In particular, the rules may be nested, that is, one rule may refer back to and incorporate one or more other rules which may also refer back to one or more other rules.

As shown in FIG. 6, the CPU_BUSY rule represents the predicate CPU_UTIL greater than 95%, as specified above in statement (1), and the PAGE_BUSY rule represents the predicate PAGE_RATE greater than 50. The HIGH_CPU, HIGH_PAGING and HIGH_IO rules represent the predicates of the average CPU_UTIL greater than 90%, average PAGE_RATE greater than 30 and average IO_COUNT greater than 5000. The BAD_RESPONSE TIME rule predicate is the combination of either the HIGH_CPU, HIGH_PAGING or HI_IO predicates. That is, the event BAD_RESPONSE_TIME is said to occur if one of the following other events occur: HIGH_CPU, HIGH_PAGING or HI_IO. Similarly, the OVERLOAD rule has reached its predicate if both the CPU_BUSY and PAGE_BUSY events occur.

The ability to store and nest rules in RuleBase Table 34 shown in FIG. 1 provides great flexibility in a network environment such as computer network 10. In particular, the same rules may well be used for several different user applications as well as be nested within other rules. By storing such rules once in RuleBase Table 34 it is not necessary to prepare these rules separately for each such application. The rules can therefore clearly be reused as necessary.

The operation flow of DataServer 14 in its simplest non-conventional implementation includes the stages of applying a request to a data engine, such as DataServer SQL engine 24, via transport network 12, causing the launching of DataProbe 16 to return data for storage in DataTable 26 and the subsequent recovery of that data by transfer via transport network 12 to requesting user application U1.

In a more sophisticated implementation, the operation flow of DataServer 14 includes the application of a request via transport network 12 and direct inquiry path 32a to DataServer SQL engine 41, the launching of DataProbe 18 to cause the collection and return of the data, and the return of the data in the form of one or more rows of data columns (as if returned from a data table) to user application U1 via Output paths 46a or 46b and transport network 12.

The operational flow of the more complex form of DataServer 14 is given in the following implementation of an event driven sampling system in accordance with the present invention which may conveniently be considered in three separate stages: event definition, event instantiation and event termination. Each such stage requires operations to be performed by both user application U1 as well as by DataServer 14, as described below:

EVENT DEFINITION

1. User Application U1 Accepts Event definition from User.

Before a rule can be entered into RuleBase Table 34, the rule must be defined in a manner usable by DataServer 14. The first step is for the User in control of user application U1 to define, within user application U1, an Event in terms acceptable to the User.

2. User application U1 Store Event definition in Situation database.

It is convenient for user application U1 to maintain a database, not shown, storing the various defined Events because such Event definitions are reusable to recall the corresponding RuleName for the resultant rule stored in RuleBase Table 34.

3. User application U1 converts Event definition to DataServer Rule SQL by translating definition tokens into Table and Column names.

Once the Event definition is stored in the user application U1 Situation database, the data representations —or tokens—used in user application U1 must be translated by user application U1 into terms usable as part of a DataServer 14 SQL statement, namely the names of the items of data needed are used as column headings of the various tables, such as DataTable 26 and AdvisorTable 38, in which such columns will be located.

4. User application U1 transfers Rule to DataServer 14 using DataServer INSERT SQL statement.

After the translation into standard SQL statement terms has been accomplished, the rule is transferred by user application U1 to transport network 12 via bi-directional communication path 20.

5. DataServer 14 performs a normal insert of the Rule into RuleBase Table 34.

DataServer 14 receives the INSERT SQL statement from transport network 12 via RuleTable input path 31 and inserts, that is stores, the rule in RuleBase Table 34.

EVENT INSTANTIATION

6. User application U1 receives/accepts indication from User that Event is to be monitored.

The user in control of user application U1 must not only store the rule in RuleBase Table 34 but indicate to user application U1 that the monitoring for a particular event is to be started. Events are indicated to be monitored at the discretion of the User and not all Events will be so indicated and those Events indicated to be monitored will not necessarily all be actually monitored at the same time.

7. User application U1 issues CreateRequest call to DataServer in an Advisor SQL statement including the EVENT() function key word specifying the rule to be applied to the SQL statement and the columns of data to be returned when the rule predicate is achieved.

After the User has indicated that a particular Event will be monitored, the user application U1 must identify the data to be returned by listing the columns of data to be retrieved upon detecting an occurrence of the event.

8. DataServer 14 instantiates a primary collection mechanism for the data in Advisor SQL issued by user application U1.

Once the Advisor SQL including the EVENT() function naming a particular rule has been received by DataServer 14, DataServer 14 must make arrangements for the collection and storage of the data specified in the Advisor SQL by the creation of AdvisorProbe 44.

9. DataServer 14 instantiates a secondary collection mechanism for the data specified in the rule named in the Event() function.

The data specified by the rule in the EVENT() function must be collected by a DataProbe, such as DataProbe 18 of FIG. 1, which is invoked in response to an SQL statement such as recursive SQL statement 30, issued by DataServer 14 to retrieve the data. If the recursive SQL statement also includes an EVENT() function, it is further reprocessed until no further EVENT() function calls are present. Thus a nesting of collection processes is created in which the Advisor level waits until the Event() level has successfully completed. The Advisor thereby becomes both a DataServer probe and an Application (issuing recursive SQL statements) at the same time and therefore may be considered a MetaProbe.

10. User application U1 issues an open call to the DataServer indicating that monitoring is to begin.

User application U1 conveys the Users decision to begin monitoring to DataServer 14.

11. User application U1 issues a wait for notification pending results of the event sampling.

After the SQL statement indicating that the monitoring is to begin has been communicated to DataServer 14, user application U1 then waits for the data to be returned and no further actions are required from user application U1.

12. DataServer 14 waits until the proper time interval, as specified by user application U1 in its CreateRequest, to collect data at the Event level.

Data sampling intervals are normally set by the requesting application. The Event level data collection is performed at the specified interval.

13. DataServer 14 invokes RuleProcessor 37 which issues recursive SQL statement 30 back to DataServer 14 to invoke the Event level data collection and analysis.

This step illustrates the recursive nature of the operation in that AdvisorProbe 44, when invoked in response to the SQL statement applied to DataServer 14, applies its own SQL to DataServer 14 to collect the data.

14. DataServer 14 invokes DataProbe 18 to perform data collection in accordance with recursive SQL statement 30.

The data emitted back to DataServer 14 in response to recursive SQL statement 30 is filtered in predicate test processor 36 in accordance with the "WHERE" clause therein. If any rows of data pass the filtering, or no filtering was specified, the condition is deemed to be true and the Event is deemed to have occurred.

15. When the Event is true, RuleProcessor 37 notifies AdvisorProbe 44 that there is Event data.

In the case of Delta Event processing as described below in greater detail, RuleProcessor 37 notifies AdvisorProbe 44 only if the Event condition has changed state, that is, only if the Event condition has gone from false to true or true to false.

16. AdvisorProbe 44 retrieves the raw data from DataBuffer 39 and emits data in AdvisorTable 38 that describes the Event.

If there are no rows of data in DataBuffer 39, i.e. the rowcount inquiry performed by Event test 42 indicates that the rowcount is not greater than 0, no Event is deemed to have occurred.

17. Once AdvisorProbe 44 has completed its data collection, DataServer 14 will send an asynchronous notification to user application U1 that the Event has data occurred and data, if any, is available on AdvisorTableOutput path 46.

18. User application U1 fetches the data rows from AdvisorTable 38 and/or notifies the User.

19. User application U1 issues a Close call to DataServer 14 indicating the end of this data collection cycle and reissues the open call if appropriate to indicate readiness to be notified at the next occurrence of the Event.

EVENT TERMINATION

20. In response to the User, when appropriate, user application U1 issues a DestroyRequest call to indicate that the condition is no longer to be monitored.

21. In response to a DestroyRequest call from user application U1, DataServer 14 and AdvisorProbe 44 close any outstanding open requests and destroy related resources.

The exact sequence of the flow, and the various calls made, depend upon the nature of the data retrieval engine and DataServer implemented as well as the characteristics of the particular programming employed.

A further enhancement of the event driven sampling data server system as described above is called Delta Processing in which AdvisorProbe 44 is only notified when the Event condition changes state rather than every time the condition is detected. That is, Delta Processing causes a notification and/or data to be returned to user application U1 when data collected by DataProbe 18 indicates that the WHERE clause of the Delta Event SQL statement has been achieved, but then does not return a further notification until the data collected by DataProbe 18 indicates that the WHERE clause has not been achieved. When an Event is either true or false twice in a row, Delta processor 48 suppresses notification to AdvisorProbe 44. Only the change from true to false or false to true will result in Advisor data collection and subsequent application notification.

An example of a Delta Event SQL statement similar to statement (3) above would be as follows:

| | | |
|---|---|---|
| SELECT | CPU_UTIL, RuleName, Predicate, | (4) |
| | TimeStamp, PAGE_RATE | |
| FROM | AvisorTable 38 | |
| WHERE | CPU = P1 and EVENT(DELTA(CPU_BUSY)). | |

With regard then to FIG. 1, in response to a Delta Event SQL statement such as statement (4) shown above, when data is returned by DataProbe 18, the data is tested by filter 36 and the data notification returned to rule processor 37 via path 40 is further tested by Delta processor 48. Delta processor 48 suppressed the notification to rule processor 37 of repetitions of the same condition. That is, the only notification passed to rule processor 37 occurs when the Event condition changes state from true to false or false to true.

Referring now to FIGS. 4 and 5, FIG. 4 repeats the showing of FIG. 2 of the data stored in DataBuffer 39 in response to 10 instances of a one minute interval sampling by DataProbe 18. FIG. 5 represents some of the additional columns of data that would be stored in AdvisorTable 38 in response to the Delta function in statement (4) for comparison with the data that is shown in FIG. 3 to have been stored in response to an Event function statement.

In particular, row 4 is stored in RuleBase Table 34 because the Event changed state from false to true, that is, row 3 was false and row 4 was true. Similarly, row 5 is stored because the Event changed state again, this time from true to false. It should be noted that row 5 did not qualify for storage as a result of an Event function as shown for comparison in FIG. 3 because row 5 does not represent a true condition for the Event, only a change in state from the previous sampling interval.

Row 8 is the next row stored in AdvisorTable 38 because it is the next change of state, from false back to true. Similarly, rows 9 and 10 are both stored in AdvisorTable 38 because they represent changes in state for the Event condition, from true back to false and back to true again, respectively.

Although many other variations of suppression or other criterion may be applied as tests to the trueness of the Event condition, the Delta function may be the most important for convenient process monitoring.

What is claimed is:

1. A computer network comprising:
   one or more user applications (U1 . . . Un);
   a plurality of computer platforms (P1 . . . Pn);
   a transport network interconnecting the computer platforms;
   a data management engine on one of said plurality of computer platforms, said engine responsive to a request for data from a user application to invoke:

at least one data probe to cause the collection of the collected data from the appropriate computer platform and the return of the collected data in the form of one or more rows of columnar data;

an event manager for filtering collected data to return the collected data to the user application only upon the occurrence of a specified condition; and data return means for applying the collected data from the data probe to the network transport for return to the user application.

2. The computer network claimed in claim 1 wherein the at least one data probe further comprises:

means specifically associated with the computer platform (P1 . . . Pn) from which the data is to be collected so that the operations of the data collection from the platform is transparent to the user application so that user applications compatible with the data management engine are usable to transparently retrieve data from heterogeneous computer platforms across the computer network.

3. The computer network claimed in claim 1, further comprising:

a data table responsive to the data probe for storage of the requested data and return of the requested data to the requesting user application.

4. The computer network claimed in claim 1, wherein the event manager further comprises:

a rule processor responsive to the filtered, collected data for returning at least a portion of the collected data to the user application.

5. The computer network claimed in claim 4, wherein the event manager further comprises:

a data buffer wherein the occurrence of the specified condition is determined by detecting that the number of rows of data stored in the data buffer is greater than zero.

6. The computer network claimed in claim 5, wherein the event manager further comprises:

an advisor probe responsive to the rule processor for collecting the data from the data buffer upon indication that the number of rows therein is greater than zero.

7. The computer network claimed in claim 6, wherein the event manager further comprises:

an advisor table for storing data processed by the advisor probe and for forwarding at least selected portions of that data to the requesting user application via the network transport means.

8. The computer network claimed in claim 4, wherein the event manager further comprises:

a rule table responsive to the network transport for storing rule definitions in accordance with a rule name, so that the user application may request specified data to be returned only upon the occurrence of the condition requirement specified in a particular rule definition by specifying the related rule name.

9. The computer network claimed in claim 8, wherein the event manager further comprises:

a nested event manager responsive to the request from the user application for returning the request to the rule processor as long as the request includes a rule name, wherein the user application may conveniently nest condition requirements within other condition requirements.

10. A method of managing data on a computer network comprising the steps of:

causing one or more user applications (U1 . . . Un) to request the collection of specified data;

interconnecting a plurality of computer platforms (P1 . . . Pn) with a transport network;

installing a data management engine on one of said plurality of computer platforms; and causing said engine to respond to the request for data from the user application by launching at last one data probe to collect the requested data from the appropriate computer platform and return the collected data in the form of one or more rows of columnar data;

filtering the collected data to return the collected data to the user application only upon the occurrence of a specified condition; and applying the collected data from the data probe to the network transport for return to the user application.

11. The method of managing data on a computer network claimed in claim 10 wherein the step of launching a data probe further comprises the step of:

associating the data probe directly with the computer platform (P1 . . . Pn) from which the data is to be collected so that the operations of the data collection from the platform is transparent to the user application wherein user applications compatible with the data management engine are usable to transparently retrieve data from heterogeneous computer platforms across the computer network.

12. The method of managing data on a computer network claimed in claim 11, further comprising the step of:

causing a data table to respond to the data probe by storing of the requested data and returning the requested data to the requesting user application.

13. The method of managing data on a computer network claimed in claim 10, further comprising the step of:

causing a rule processor to respond to the filtered, collected data by returning at least a portion of the collected data to the user application.

14. The method of managing data on a computer network claimed in claim 13 further comprising the step of:

for storing the filtered, collected data in a data buffer wherein the occurrence of the specified condition is determined by detecting that the number of rows of data stored in the data buffer is greater than zero.

15. The method of managing data on a computer network claimed in claim 14 further comprising the step of:

causing an advisor probe to respond to the rule processor by collecting the data from the data buffer upon indication that the number of rows therein is greater than zero.

16. The method of managing data on a computer network claimed in claim 15 further comprising the step of:

providing an advisor table for storing data processed by the advisor probe and for forwarding at least selected portions of that data to the requesting user application via the network transport means.

17. The method of managing data on a computer network claimed in claim 13 further comprising the step of:

providing a rule table responsive to the network transport for storing rule definitions in accordance with a rule name, wherein the user application may request that specified data is to be returned only upon the occurrence of the condition requirements specified in a particular rule definition by indicating the related rule name.

18. The method of managing data on a computer network claimed in claim 16 further comprising the step of:

providing a nested event manager responsive to the request from the user application for returning the request to the rule processor as long as the request includes a rule name, wherein the user application may conveniently nest condition requirements within other condition requirements.

* * * * *

UNITED STATES PATENT AND TRADEMARK OFFICE
CERTIFICATE OF CORRECTION

PATENT NO.   : 5,809,238
DATED        : September 15, 1998
INVENTOR(S)  : Sam Greenblatt and Alex Yung It is certified that error appears in the above-indentified patent and that said Letters Patent is hereby corrected as shown below:

Column 5, line 28, "Pi" should read --P1--.

Column 7, line 9, "EVENTO" should read --EVENT( )--.

Column 7, line 27, "EVENTO" should read --EVENT( )--.

Column 9, line 30, "Evento" should read --Event( )--.

Column 10, line 4, "PI" should read --P1--.

Column 12, line 37, 'EVENTO" should read--EVENT( )--.

Signed and Sealed this

Twenty-sixth Day of October, 1999

Attest:

Q. TODD DICKINSON

*Attesting Officer*          *Acting Commissioner of Patents and Trademarks*